US011394430B2

(12) United States Patent
Van Nieuwenhuyze

(10) Patent No.: US 11,394,430 B2
(45) Date of Patent: Jul. 19, 2022

(54) TRANSACTION MANAGEMENT IN AN NFC DEVICE

(71) Applicant: Proton World International N.V., Diegem (BE)

(72) Inventor: Olivier Van Nieuwenhuyze, Wezembeek-Oppem (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 0 days.

(21) Appl. No.: 17/283,839

(22) PCT Filed: Oct. 14, 2019

(86) PCT No.: PCT/EP2019/077827
§ 371 (c)(1),
(2) Date: Apr. 8, 2021

(87) PCT Pub. No.: WO2020/078930
PCT Pub. Date: Apr. 23, 2020

(65) Prior Publication Data
US 2021/0384942 A1     Dec. 9, 2021

(30) Foreign Application Priority Data
Oct. 15, 2018 (FR) ..................... 1871180

(51) Int. Cl.
*H04B 5/00* (2006.01)
*H04W 4/00* (2018.01)
*H04W 12/08* (2021.01)
*G06Q 20/32* (2012.01)
(Continued)

(52) U.S. Cl.
CPC ...... *H04B 5/0031* (2013.01); *H04M 1/72403* (2021.01); *H04W 4/80* (2018.02)

(58) Field of Classification Search
None
See application file for complete search history.

(56) References Cited

U.S. PATENT DOCUMENTS 8,989,724 B2 * 3/2015 Boehler ............ G06K 7/10237
                                                    455/418
9,064,253 B2 * 6/2015 Royston ............ G06Q 20/4012
9,252,845 B2 * 2/2016 Geslin .................. H04B 5/0062
(Continued)

FOREIGN PATENT DOCUMENTS

CN     103942898 A     7/2014
EP     2672735 A1      12/2013
(Continued)

OTHER PUBLICATIONS

Proton World International N.V., "Written Opinion and Search Report of the International Searching Authority" International Searching Authority, PCT Application No. EP2019/077827, Filed Oct. 14, 2019, 5 pages.

*Primary Examiner* — Tuan A Tran
(74) *Attorney, Agent, or Firm* — Slater Matsil, LLP

(57) ABSTRACT

The present disclosure concerns a near-field communication routing method and device, in a device including: a near-field communication router (22); at least one secure element; a user interface module (27); and a management unit (4), wherein the management unit selects a secure element towards which a communication is to be routed.

28 Claims, 2 Drawing Sheets

(51) Int. Cl.
    *H04W 4/80*         (2018.01)
    *H04M 1/72403*    (2021.01)

(56)                    References Cited

U.S. PATENT DOCUMENTS

| | | | |
|---|---|---|---|
| 9,337,899 B2* | 5/2016 | Bhatia | H04B 5/0031 |
| 9,351,164 B2* | 5/2016 | Van Nieuwenhuyze | H04W 12/06 |
| 9,432,087 B2* | 8/2016 | Lee | H04B 5/0031 |
| 9,673,870 B2* | 6/2017 | Geslin | H04B 5/0062 |
| 9,894,469 B2* | 2/2018 | Van Nieuwenhuyze | H04W 12/02 |
| 9,916,575 B2* | 3/2018 | Salcedo | G06Q 20/3278 |
| 9,948,752 B2* | 4/2018 | Do Khac | H04W 4/80 |
| 9,960,812 B2* | 5/2018 | Kumar | H04W 4/80 |
| 9,977,890 B2* | 5/2018 | Alberti | G06F 21/34 |
| 10,397,276 B2* | 8/2019 | Li | H04L 63/20 |
| 2012/0196529 A1 | 8/2012 | Huomo et al. | |
| 2014/0327523 A1* | 11/2014 | Daniel | H04B 5/0056 340/10.5 |
| 2016/0140537 A1* | 5/2016 | Salcedo | G06Q 30/04 705/44 |
| 2016/0226767 A1* | 8/2016 | Do Khac | H04L 45/52 |
| 2017/0142159 A1* | 5/2017 | Li | H04L 63/0492 |

FOREIGN PATENT DOCUMENTS

| | | |
|---|---|---|
| EP | 2775739 A1 | 9/2014 |
| WO | 2016076997 A1 | 5/2016 |

* cited by examiner

TRANSACTION MANAGEMENT IN AN NFC DEVICE

CROSS-REFERENCE TO RELATED APPLICATIONS

This application is a section 371 National Phase filing of PCT Patent Application No. PCT/EP2019/077827, filed on Oct. 14, 2019, which claims the priority benefit of French patent application number 1871180, filed on Oct. 15, 2018, all of which applications are hereby incorporated by reference in their entireties to the maximum extent allowable by law.

TECHNICAL FIELD

The present disclosure generally concerns electronic devices and methods, and, more specifically, devices integrating NFC (Near Field Communication) circuits, and associated methods. The present disclosure more particularly applies to the management of near-field transactions between elements of the device and the outside.

BACKGROUND

Near-field radio frequency communication systems are more and more prevalent, particularly since the development of near-field communication technologies according to ISO standard 14443 or the NFC forum.

Such systems use a radio frequency electromagnetic field emitted by a device (terminal or reader) to communicate with another device (card).

Such communications integrate various transactions between elements internal or external to the near-field communication device. The management of such transactions is made complex by the multiplicity of the applications capable of being hosted by the device.

Document EP-A-2775739 describes a device equipped with a near field communication router in which the routing of the communications between the exterior of the device and secured elements of the device is implemented by the router so as the decision of the selection of the secured element from applicative requests.

Document EP-A-2672735 describes a routing mechanism for identifying near field communication application in card emulation mode.

Document WO-A-2016076997 describes a routing mechanism for secured elements.

Documents US-A-2016140537 describes adaptive routing systems and methods for multiple secured elements.

SUMMARY

There is a need to improve near-field communication devices, particularly in terms of management of the transactions between different applications hosted by the device.

Such a need is particularly present for the management of applications requiring a secure environment such as, for example, the management of the information of a service provider (the keys and data of the service provider are generally protected by elements providing a high level of security against attacks).

An embodiment aims at reducing all or part of the disadvantages of known techniques of transaction management in a near-field communication device.

An embodiment provides a near-field communication routing method, in a device comprising:

a near-field communication router;
at least one secure element;
a user interface module; and
a management unit, wherein the management unit selects a secure element towards which a communication is to be routed.

According to an embodiment, the management unit selects the secure element according to data received from the user interface module.

According to an embodiment, the management unit selects the secure element based on an analysis of the communication and/or of the electromagnetic field.

According to an embodiment, the management unit selects the secure element based on information relative to the environment such as GPS positioning, information relative to the Wi-Fi transaction type, or to the Bluetooth transaction type.

According to an embodiment, the management unit selects the secure element based on an analysis of a first received communication frame.

According to an embodiment, the near-field communication router comprises a routing table configured at least by the management unit.

According to an embodiment, the router comprises a configuration where its routing table directs any request of selection of a secure environment towards the management unit.

According to an embodiment, the router comprises a configuration where its routing table directs requests of selection of the non-active/non-available applications hosted in a secure environment towards the management unit and directly directs requests of selection of the active/available applications towards these applications hosted in the secure elements.

According to an embodiment, the router comprises a configuration where its routing table directs selection requests towards a secure environment and, if the request is not addressed to the secure element of this environment, the router sends the request to the management unit.

According to an embodiment, the router comprises a configuration where its routing table directs selection requests towards a secure environment and, if the request is not addressed to the secure element of this environment, the secure element informs the management unit.

According to an embodiment, the router once configured by the management unit comprises, in its routing table, parameters for routing communications towards the selected secure element.

According to an embodiment, a user application is associated with the user interface module to interact with the management unit.

According to an embodiment, each secure element hosts at least one card environment, and one or a plurality of environments may be selected by the management unit.

According to an embodiment, a communication is initiated by the near-field communication router and is continued over another radio frequency communication channel.

An embodiment provides a near-field communication device, comprising:

a near-field communication router;
a plurality of secure elements;
a user interface module; and
a management unit, wherein the management unit selects a secure element towards which a communication is to be routed.

According to an embodiment, the device is programmed to implement the near-field communication routing method.

According to an embodiment, the management unit forms part of a near-field communication controller integrated in the device.

An embodiment provides a mobile phone comprising a near-field communication device.

BRIEF DESCRIPTION OF THE DRAWINGS

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
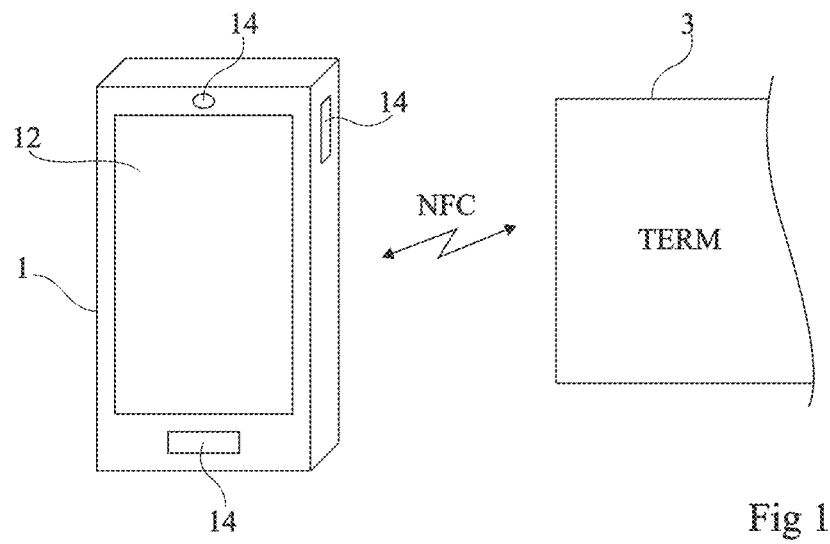
FIG. 1 schematically shows in the form of blocks an example of a near-field communication system of the type to which the described embodiments apply.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the communication protocols (electromagnetic field modulation techniques), be they secure or non-secure, between the device and the outside have not been detailed, the described embodiments being compatible with usual techniques of generation and of modulation of radio frequency signals for near-field communication.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10%, preferably of plus or minus 5%, of the value in question.

FIG. 1 schematically shows in the form of blocks an example of a near-field communication system of the type to which the described embodiments apply.

Near-field communication circuits can especially be found in communicating electronic devices of the type of cell phone 1. Typically, a cell phone, equipped with NFC functionalities, is capable of communicating not only over the wireless telephone network (for example, GSM) or according to medium-range radio frequency protocols (for example, Wi-Fi, Bluetooth), but also in near field (also called contactless mode), in quasi-contact at 4-5 centimeters, according to standards, for example 14443 or NFC Forum. Reference will be made hereafter to an NFC device to designate a device integrating near-field contactless communication functionalities.

The NFC device (telephone 1 in FIG. 1) is capable of communication by near-field electromagnetic coupling with another NFC device 3. This other device 3, for example, a terminal (TERM), radiates a magnetic field intended to be captured by the NFC circuits of the phone. Although the case of a telephone 1 and of a terminal 3 (for example, a contactless payment terminal) is considered, all that will be described more generally applies to any system where an electromagnetic transponder or NFC device detects an electromagnetic field radiated by a reader or terminal. In other words, the embodiments apply to any system where two NFC devices 1 and 3 are capable of communication by near-field electromagnetic coupling. According to applications, for a communication, one of the devices operates in so-called reader mode while the other operates in so-called card mode, or the two devices communicate in peer-to-peer mode (P2P). In other applications targeted by the present disclosure, the communication is initiated in near-field, but the actual transaction (the rest of the communication) is performed over another channel, for example, Bluetooth or another contactless transmission channel. Each device 1, 3, comprises various electronic circuits, among which a circuit forming a near-field communication interface, or NFC interface, between the NFC device and the outside. Such an interface is used, among others, in reader mode, to generate a radio frequency signal transmitted by means of an antenna and, in card mode, to decode a detected radio frequency signal. The radio frequency field generated by one of the devices is detected by the other device, which is located within its range and which also comprises an antenna.

In the example of a smartphone-type mobile terminal 1, the latter comprises at least one display 12 as well as elements 14 (buttons, keys, print sensor, screen touch areas, cameras, etc.) forming user interface elements.

Figure 2:
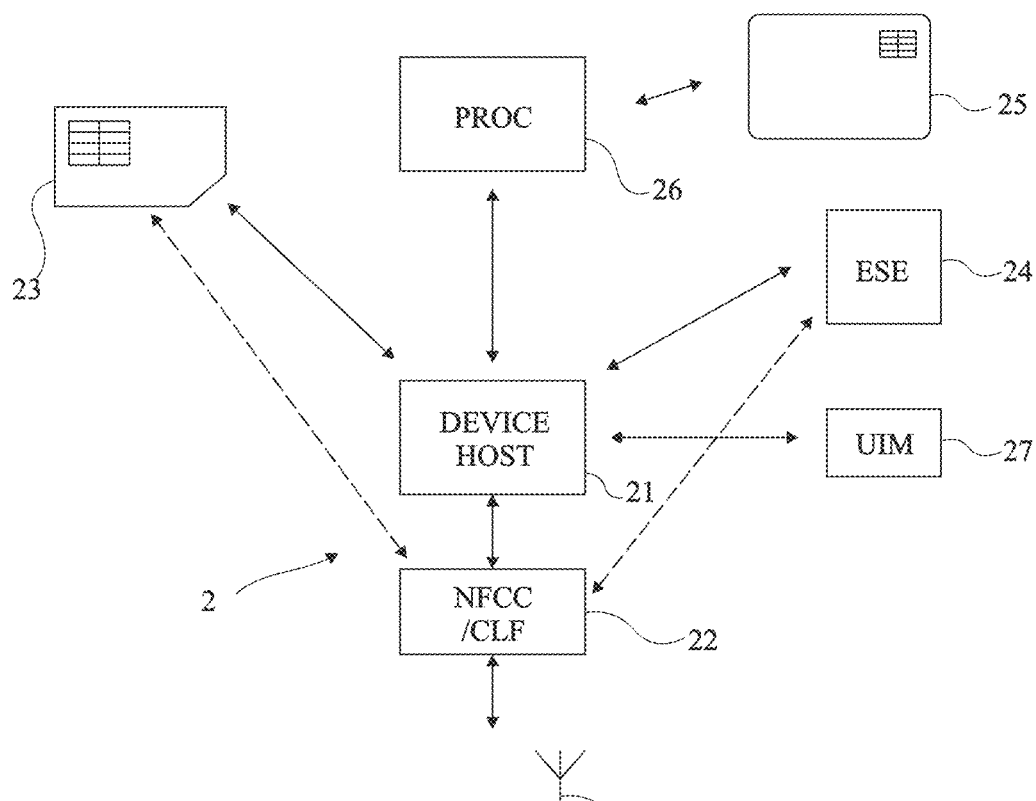
FIG. 2 schematically and partially shows different components of a near-field communication device.

FIG. 2 schematically and partially shows different components of a near-field communication device 2. Such a device may form part of mobile device 1 and of terminal 3 of FIG. 1 according to applications.

The near-field operation of a device 2 is based on the use of a NFC controller or NFC router 22 (NFCC/CLF) associated with a contactless front end (CLF). Router 22 communicates on the one hand with a transmit/receive antenna 29 and on the other hand with a host circuit or host processor 21 (DEVICE HOST) of device 2. Host circuit 21 is capable of relaying information between controller/router 22 and different applications hosted by device 2. Reference will indifferently be made hereafter to a router or controller (NFC router, CLF router, NFC controller, NFCC controller) to designate circuit 22.

Among such applications, some are so-called secure applications (as opposed to non-secure applications) which use specific validation or control circuits. Such secure applications are then totally or partly hosted by specific circuits commonly called secure elements (SE) which are provided with processing and/or key/code/signature/etc. storage circuits enabling to validate/process/authenticate/etc. a secure operation or transaction. For example, a secure transaction is a payment operation (a contactless payment operation), an access control operation, an application or peripheral unlocking operation, etc.

Different secure elements are likely to communicate with processor 21 to carry out (generally in ciphered fashion) NFC transactions. These are, for example:

removable secure elements 23, assembled in a reader of device 2, for example, a SIM (Secure Identification Module) card;

secure elements integrated to device 2, for example, an embedded secure element (ESE) 24 or an integrated/imbedded secure element (iSE); and/or secure elements supported by elements 25 external to device 2 (for example, payment cards) and having their information transiting through a generic processor 26 (PROC) (not dedicated to NFC operations) contained by device 2 and communicating with circuit 21 and, thereby, with controller 22.

Controller 22 particularly contains a routing table defining the parameters and communication channels between the radio frequency contactless front end and the elements of device 2 according to the executed application. Such a routing table enables host circuit 21 to correctly route communications towards the different elements and enables controller 22 to correctly transmit the communications received from circuit 21. In certain cases, secure elements are capable of directly communicating with controller 22 without passing through host circuit 21. This case is illustrated in FIG. 2 by links in dotted lines between controller 22 and elements 23 and 24.

User interface modules 27 (UIM) are also capable of communicating with controller 21 when an interaction with the user is required. Such modules typically are applications (app) dedicated to the different systems capable of interacting with the telephone for applications requiring involving a secure element. These are for example electronic purse applications, transport ticket booking applications, bank applications, etc. User interface modules 27 use display 12 of the telephone and various input/output devices 14 to interact with the user.

Of course, other applications may also have access to NFCC controller 22 for near-field communication purposes. However, the described embodiments more particularly apply to the management of secure applications.

The development of NFC applications which include more and more secure applications (for example, payment applications) generates specific needs in terms of management of NFC transactions (using NFC communications). In particular, more and more secure elements, which are not supported by cards, emulate a contactless card operation to enable to use telephone 1 in the same way as a contactless card.

Figure 3:
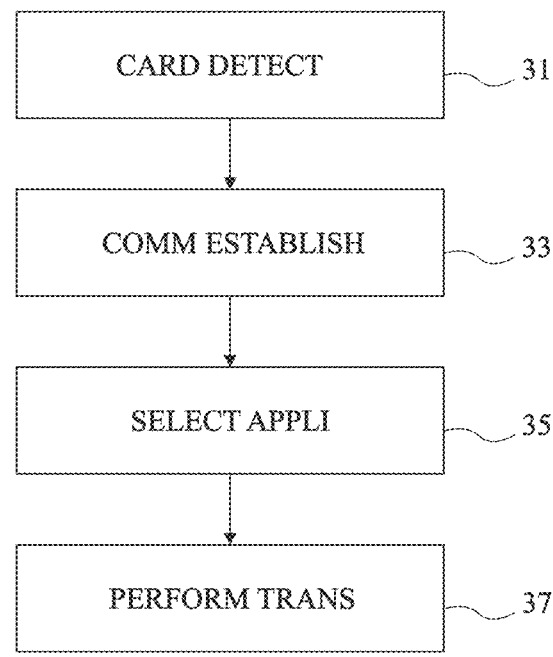
FIG. 3 schematically shows in the form of blocks an example of steps for carrying out a transaction between elements internal and external to the near-field communication device.

FIG. 3 schematically shows in the form of blocks an example of steps for carrying out a transaction between elements internal and external to the device by near-field communication.

Typically and in simplified fashion, a transaction implying a secure element starts with a process of establishment of a communication between device 1 (FIG. 1) operating in card mode and a terminal 3.

Terminal 3, which operates in reader mode, emits a radio frequency electromagnetic field intended to be detected by a card. Such a field is emitted, according to systems, continuously or in periodic frames until a card 1 is detected (block 31, CARD DETECT). Once the card has been detected, a communication establishment process (block 33, COMM ESTABLISH) is implemented. During this communication establishment step, specific radio frequency parameters are expected by the terminal according to the application that it targets in the telephone. The parameters generally differ according to the secure element implied in the transaction to come. The parameters may concern the modulation type, the coding type, time, frequency parameters, etc.

When the communication is established, the terminal sends a request to the telephone (block 35, SELECT APPLI) to select the application according to the operation that it desires to perform. Such a request should enable, on the telephone side, to select the application and more particularly the secure element, with which the transaction then is to be made. Once the application has been selected, it has access to CLF router 22 and the transaction is carried out (block 37, PERFORM TRANS). The transaction is carried out by using the established communication.

The above-described process is usual per se as concerns the operation on the terminal side.

However, on the side of the device operating in card mode, the presence of multiple secure elements generates specific constraints.

Indeed, a plurality of secure elements, requiring using the radio frequency parameters and hosting applications which are simultaneously available on the terminal side, and thus from the radio frequency communication viewpoint, may sometimes be present. In this case, CLF router 22 may be in a situation where it will have to determine to which secure element the request should be transmitted and the ensuing transaction.

A plurality of operating systems (OS) having their own contactless applications (Virtual Primary Platform—VPP system) may also be hosted in or compatible with a same integrated secure element (iSE) or embarked secure element (ESE) and the active VPP application may be incompatible with that hosted by the reader.

A difficulty is that, in a usual system, the user does not know that an action is required at the level of CLF router 22 to allow the transaction.

Figure 4:
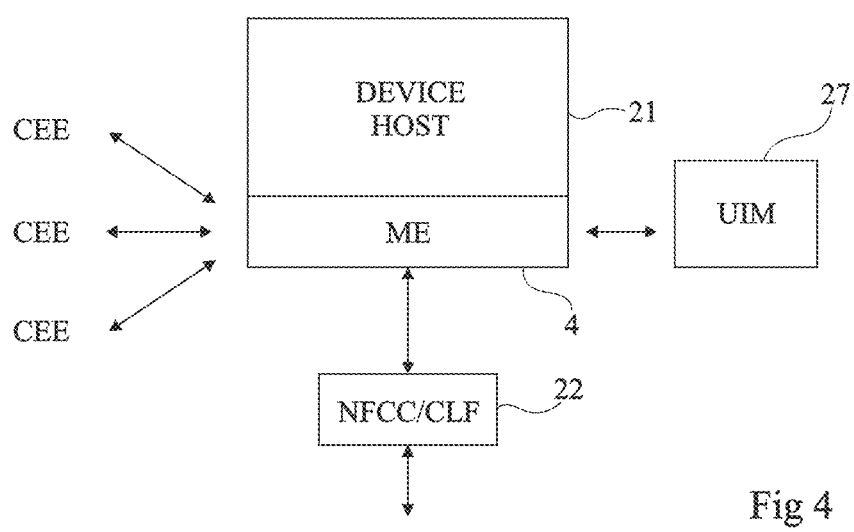
FIG. 4 schematically and partially shows an embodiment of a near-field communication device.

FIG. 4 schematically and partially shows an embodiment of a near-field communication device.

It is provided to interpose, between the NFC controller/CLF router 22 and host circuit 21, a management unit 4 (ME) having the function of enabling to route application selection requests originating from a terminal as well as secure transactions. Unit 4 communicates (is interfaced) with the different elements (23, 24, 25) emulating a secure card environment (CEE). Unit 4 also has access to the different user interface modules 27 (UIM), that is, to the applications in charge of an interaction with the user.

More precisely, according to the disclosed embodiments, the management unit 4 forms part of the host circuit 21.

One could have thought to associate the management unit to the NFC controller 22. However, the NFC controller or router 22 does not know the system configuration. Consequently, it would not have the elements to correctly orient the selection requests coming from a secured element and the transactions.

The described embodiments take advantage from the fact that, in most secure applications (payment, authentication, etc.), a user intervention is required. Such an intervention for example corresponds to the validation of a payment during a transaction with a payment terminal, a debit acceptance, etc.

Thus, it is neither disturbing nor constraining to call upon the user to validate that of the secure elements, or more generally that of the card emulation environments (where a same secure element may comprising a plurality of environments) which should be selected for the transaction. Additionally, such applications being generally considered as critical in terms of access to private data, such a selection by the user will be well received. The interaction between the user interface 27 and the device transiting via the host circuit 21, it is advantageous to provide the management unit 4 in this host circuit 21.

Management unit 4 knows (contains parameters and identifiers of) all the applications installed via all the secure elements contained in the cell phone. For this purpose, any application hosted in any secure element of device 2 registers (for example, in a phase of initialization of device 2 or on starting of the concerned application) by unit 4. Thus, unit 4 knows, at any time, the active or inactive state of each application. It is thus, here also advantageous that the management unit is contained in the host circuit 21.

When a same secure element hosts a plurality of applications, that is, a plurality of card emulation environments, management unit 4 may (via a control by the user) either combine the radio frequency parameters according to rules associated with the different hosted applications, or select a single environment.

The actual routing of requests and of transactions uses the usual elements of a CLF router. In particular, such a router 22 generally comprises a routing table enabling it to route communications towards the appropriate elements (secure or non-secure) of the telephone. The intervention of management unit 4 comprises configuring the NFCC controller 22, and thus modifying its routing table to enable it to properly route transactions.

As a variation, any communication and transaction transits through the management unit 4 which directly performs the routing towards the secure elements, the routing table of the router routing any secure communication and transaction towards the arbiter of the management unit.

In other words, the host circuit arbitrates and activates the applications hosted by the secured element, to allow the communications between these applications and the router, and the secured element towards which routing a communication is selected by the management unit contained in the host circuit.

The system operates as follows. Management unit 4 programs router 22 (its routing table) so that, when a selection control signal originating from a terminal calls a secure application which is not available in controller 22 (for example, a secure application which is not active), the control signal is redirected towards a circuit or a function of arbitration or selection contained in management unit 4. The arbitration function is configured (programmed) so that when the "arbiter" receives a selection control signal, either it selects the appropriate card environment, or it offers to the user to select the environment that he/she desires.

Preferably, once the selection has been performed, it is programmed in the routing table of router 22 to gain time during subsequent transactions. Such a programming remains (that is, the arbiter is inactive) as long as the user does not perform an intentional intervention or as the environment in terms of secure elements is not modified (addition, suppression of a secure element, for example).

Preferably, when the cell phone (the CLF router) detects a call for a secure environment, only the secure applications are active and the other applications hosted by the phone are deactivated, except for a specific application associated with the management unit to enable the user to select the secure element that he/she desires to associate with the request.

The selection by the user thus preferably uses a specific application associated with the management unit 4. Such an application is for example automatically started by the management unit 4 upon reception of a selection request that it receives from router 22 and at any time under control of the user.

The detection, by management unit 4, of the nature and of the type of transaction, to enable it to select the secure element or the application/environment of a secure element towards which the communication should be routed, may take different forms. According to an embodiment, management unit 4 selects the secure environment and/or an environment and/or an application therein based on an analysis of the communication and/or of the electromagnetic field (for example, the intensity of the field, the type of polling requests, the pauses between requests, the anticollision process used, the error management in the anticollision process, etc.). According to an embodiment, the management unit receives information from the user, via interface module 27, enabling it to identify the secure element and/or the environment/application. According to still another example, management unit 4 analyzes the first frame received from the reader to identify the secure element and/or the concerned environment or application. Such detection modes may of course be combined. In all cases, it may be provided for any change in configuration resulting from this detection to be conditioned by a confirmation by the user, via user interface module 27.

As a specific embodiment, the following situations can be mentioned.

The case of a system comprising a secure chip which implements a management system of a plurality of operating systems (OS) with the limitation that a single processing system at a time can process the resources of processor 26 (FIG. 2). Accordingly, if another operating system has to be activated, the first one should be "discharged" to (re)charge the second one (technology described as VPP). If the operating system which is active during the NFC transaction hosts a payment application but the application targeted by the NFC transaction is located in the second operating system contained in a secure element which is not active during the transaction, CLF router 22 transmits the request to management unit 4 which, when it will detect the request, will reconfigure the secure element so that the second operating system is available in the new transaction. Management unit 4 takes charge of (or commands) the reconfiguration of the routing table of the NFCC controller so that the next transaction is sent to the secure element which hosts the second operating system.

According to another example, a system hosting a plurality of secure elements which do not operate in collaborative mode (Managing Entity-legacy) is considered. Management unit 4 then intercepts the beginning of the transmission to reconfigure the CLF router so that the next transmission reaches the secure element which hosts the application targeted by the transaction. For example, an embarked secure element (eSE) 24 hosts a payment application and a secure identification module (SIM) 23 hosts a transit application. Assuming that, in the current configuration, the NFCC controller sends payment transactions to embarked secure element 24 and transit transactions to management unit 4, if the contactless reader starts a transit transaction, the transaction will be sent to the management unit which will reconfigure the routing tables of the NFCC controller (and the other parameters if need be) so that the next transaction is sent to the secure identification module (SIM) 23 and so that the payment transactions are sent to management unit 4.

In the two above examples, management unit 4 may request from the user a confirmation for the reconfiguration.

Further, in both examples, management unit 4 detects the transaction type due to the sent starts of frame. Other methods may also be used to detect the transaction type (for example, the analysis of the reader field, the analysis of the polling type, of the anticollision, etc.). Other means such as GPS (for example, in the subway, the management unit would select the transit application) or an identification of the transaction type over another channel (for example, a Bluetooth or Wi-Fi signal would indicate the type of transaction in a store) may also be used.

Other embodiments are of course possible.

An advantage of the described embodiments is that they do not require modifying the actual applications. Indeed, the management unit manages by itself the call to the application/user interface, which enables to correctly route the selection request originating from the terminal as well as the ensuing transaction.

An advantage of the described embodiments is that they require no modification on the terminal side. Thus, card devices 1 formed according to the described embodiments are compatible with existing terminals.

Various embodiments and variations have been described. Those skilled in the art will understand that certain features of these various embodiments and variations may be combined, and other variations will occur to those skilled in the art. For example, it may be provided for a communication to be initiated by the near-field communication router 22 and for the communication to be then continued (that is, for the transaction itself, of payment for example, to be carried out) over another radio frequency communication channel, for example, Wi-Fi, Bluetooth, etc.

Finally, the practical implementation of the described embodiments and variations is within the abilities of those skilled in the art based on the functional indications given hereinabove. In particular, the hardware and software implementation of the management unit is within the abilities of those skilled in the art according to the application and to the provided functional indications.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A near-field communication routing method, in a device comprising an antenna, a near-field communication router, one or more secure elements, a user interface module, and a management unit separate from the router, the method comprising:
configuring, by the management unit, a routing table contained in the router;
receiving, by the antenna, a communication from a terminal;
selecting, by the management unit via the routing table, one secure element, of the one or more secure elements, towards which the communication is to be routed; and
directing, by the router using the routing table, requests of selection of non-active/non-available applications hosted in a secure environment towards the management unit.

2. The method of claim 1, wherein the management unit selects the one secure element according to data received from the user interface module.

3. The method of claim 1, wherein the management unit selects the one secure element based on an analysis of the communication and/or an electromagnetic field of the communication.

4. The method of claim 1, wherein the management unit selects the one secure element based on information relative to an environment, a wireless-fidelity (Wi-Fi) transaction type, or a Bluetooth transaction type.

5. The method of claim 4, wherein the information relative to the environment is global positioning system (GPS) positioning.

6. The method of claim 1, wherein the management unit selects the one secure element based on an analysis of a first received communication frame.

7. The method of claim 1, further comprising directing, by the router using the routing table, any request of selection of the secure environment towards the management unit.

8. The method of claim 1, further comprising directly directing, by the router using the routing table, requests of selection of active/available applications towards the active/available applications hosted in the one or more secure elements.

9. The method of claim 1, wherein the router, once configured by the management unit comprises, in its routing table, parameters of routing of communications towards the one secure element.

10. The method of claim 1, wherein a user application is associated with the user interface module to interact with the management unit.

11. The method of claim 1, wherein each secure element hosts at least one card environment, and one or a plurality of environments are selected by the management unit.

12. The method of claim 1, wherein the communication is initiated as a near-field communication, and is continued over another radio frequency communication channel.

13. A near-field communication device, comprising:
a near-field communication router communicatively coupled to a management unit and comprising a routing table configured by the management unit;
a plurality of secure elements communicatively coupled to the management unit;
a user interface module communicatively coupled to the management unit; and
the management unit, separate from the router and configured to select, via the routing table, one secure element, of the plurality of secure elements, towards which a communication is to be routed;
wherein the router is configured to direct, using the routing table, requests of selection of non-active/non-available applications hosted in a secure environment towards the management unit.

14. The device of claim 13, wherein the management unit is part of a host circuit integrated in the device.

15. The device of claim 13, wherein the router is configured to direct, using the routing table, any request of selection of the secure environment towards the management unit.

16. The device of claim 13, wherein the router is configured to directly direct, using the routing table, requests of selection of active/available applications towards the active/available applications hosted in the plurality of secure elements.

17. A near-field communication routing method, in a device comprising an antenna, a near-field communication router, one or more secure elements, a user interface module, and a management unit separate from the router, the method comprising:
configuring, by the management unit, a routing table contained in the router;
receiving, by the antenna, a communication from a terminal;

selecting, by the management unit via the routing table, one secure element, of the one or more secure elements, towards which the communication is to be routed;

directing, by the router using the routing table, selection requests towards a secure environment; and determining, by the management unit, that a selection request is not addressed to a specific secure element of the secure environment.

18. The method of claim 17, wherein the determining comprises the management unit receiving the selection request from the router.

19. The method of claim 17, wherein the determining comprises the management unit being informed of the selection request by the specific secure element.

20. The method of claim 17, wherein the management unit selects the one secure element according to data received from the user interface module.

21. The method of claim 17, wherein the management unit selects the one secure element based on an analysis of the communication and/or an electromagnetic field of the communication.

22. The method of claim 17, wherein the management unit selects the one secure element based on information relative to an environment, a wireless-fidelity (Wi-Fi) transaction type, or a Bluetooth transaction type.

23. The method of claim 22, wherein the information relative to the environment is global positioning system (GPS) positioning.

24. The method of claim 17, wherein the management unit selects the one secure element based on an analysis of a first received communication frame.

25. A near-field communication device, comprising:
a near-field communication router communicatively coupled to a management unit and comprising a routing table configured by the management unit, wherein the router is configured to direct, using the routing table, selection requests towards a secure environment;
a plurality of secure elements communicatively coupled to the management unit;
a user interface module communicatively coupled to the management unit; and
the management unit, separate from the router and configured to:
select, via the routing table, one secure element, of the plurality of secure elements, towards which a communication is to be routed; and
determine that a selection request is not addressed to a specific secure element of the secure environment.

26. The device of claim 25, wherein the management unit is part of a host circuit integrated in the device.

27. The device of claim 25, wherein the management unit configured to determine comprises the management unit configured to receive the selection request from the router.

28. The device of claim 25, wherein the management unit configured to determine comprises the management unit configured to be informed of the selection request by the specific secure element.

\* \* \* \* \*